United States Patent [19]

Gibson et al.

[11] Patent Number: 5,054,969
[45] Date of Patent: Oct. 8, 1991

[54] MARKING, GAUGING AND DOWEL DRILLING DEVICE

[75] Inventors: Jeremy H. Gibson, Eastlake; Lawrence E. Buehner, Chardon; Paul J. Collander, Hudson, all of Ohio

[73] Assignee: Leichtung, Inc., Cleveland, Ohio

[21] Appl. No.: 495,116

[22] Filed: Mar. 16, 1990

[51] Int. Cl.⁵ .............................................. B23B 47/28
[52] U.S. Cl. ................................... 408/115 R; 33/638; 83/468.6; 408/108
[58] Field of Search ............... 408/72 R, 72 B, 115 R, 408/115 B, 103, 108, 109; 83/468.6; 33/628, 636, 638, 640-642

[56] References Cited
U.S. PATENT DOCUMENTS 2,470,038 5/1949 Long ........................... 408/115 R X
4,805,505 2/1989 Cantlin ............................. 83/468.6

Primary Examiner—Steven C. Bishop
Attorney, Agent, or Firm—Frank B. Robb

[57] ABSTRACT

A device for marking centerlines of wood board edges to facilitate drilling dowel holes in the edges of different boards to provide matching, with parts to locate holes and hold such boards while drilling is performed, and where holes in the same relationship in such boards are desired, and a guide or guides for drilling such holes to provide for matching the same so that dowels may be inserted in corresponding holes to maintain the boards in connected relation with the planes of the board surfaces coinciding where desired.

10 Claims, 2 Drawing Sheets

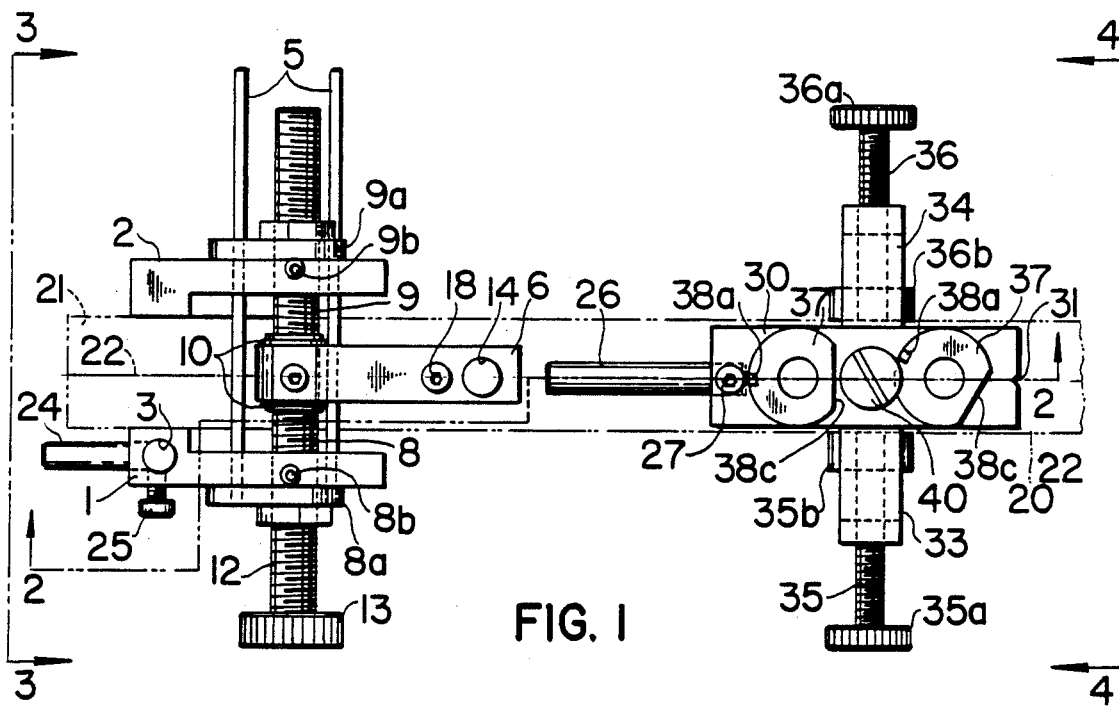
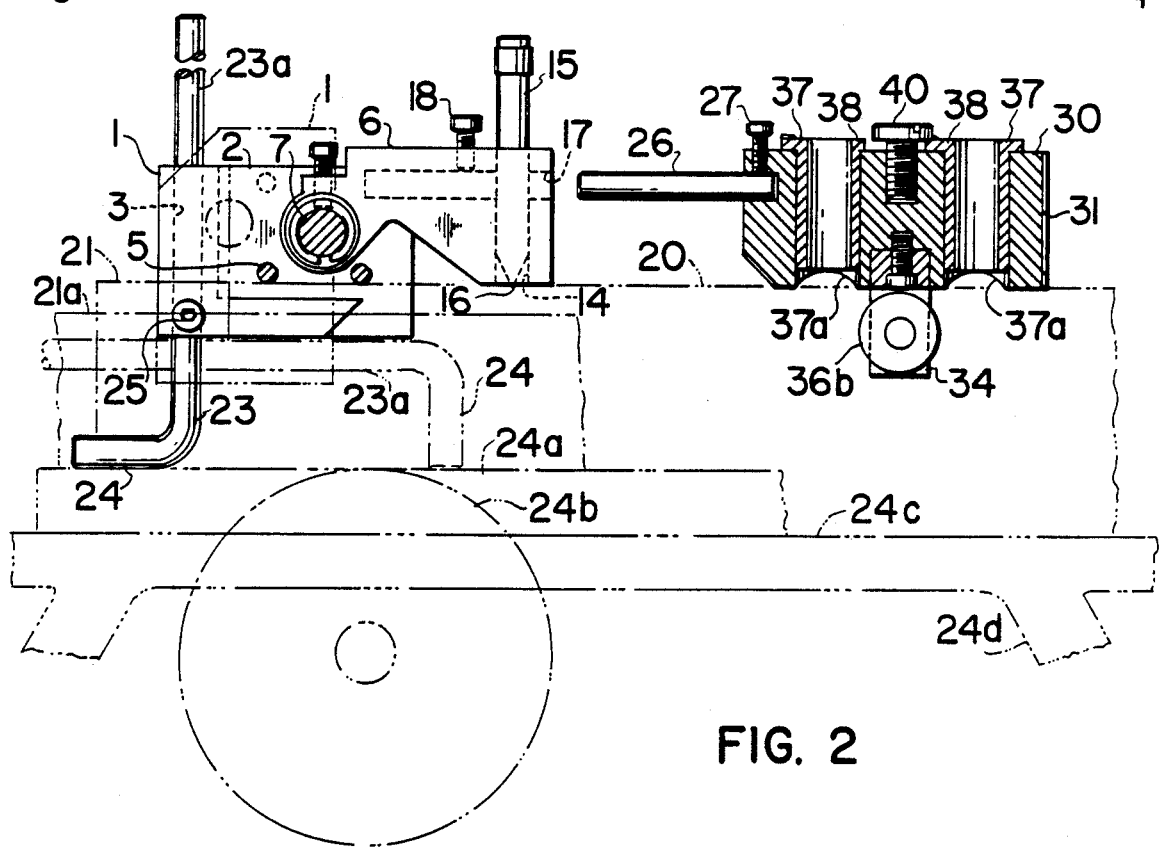

MARKING, GAUGING AND DOWEL DRILLING DEVICE

FIELD OF INVENTION

The invention hereof is found in the field of marking, gauging and drilling of holes for dowels where it is desired to match board edges and provide an ultimate unified connection of the boards in planar alignment.

THE PRIOR ART

We are not aware that any device like the disclosure herein is presently to be found in the prior art, with the possible exception that the patent of Cantlin No. 4,805,505, does disclose a clamping device which includes some mechanical elements which resemble some parts of the disclosure herein. However there is no contemplation in that patent that the parts thereof are to be used for a similar purpose of gauging, marking and drilling of dowel holes, especially the matching of holes in different boards for connection of the boards at their edges, as in the art of dowelling.

As would be expected there are may dowelling jigs in the patented art, but the combination contemplated by the instant invention is not known to us, and our invention is useful for many other operations in the woodworking art.

The patent of Long No. 2,470,038 discloses a jig for dowelling including clamping parts, but is not provided with means to mark the centerline, nor is intended to provide for drilling holes for connecting angular or compound angle ends of boards or the like.

The same shortcoming is present in Saunders Pat. No. 2,783,665 as well as Silken No. 3,674,376.

Other such patents could be referred to but the compound angular drilling is lacking in those as well.

GENERAL DESCRIPTION OF THE INVENTION

The device hereof includes clamping guiding means with a swing block having provisions for marking means to trace a line in suitable locations centrally of the edge of a board which can be duplicated centrally along the edge of another board for matching purposes, and a second block depending from the swing block, connected thereto and adjustable in relation thereto and having provisions for drilling a dowel hole or holes in corresponding planar and angular locations and in compound angular relation as well, for matching with another hole or holes in a board edge. All this to the end of mating the boards for use as an assembly, usually with the surface planes thereof in alignment. However, where compound angular connection is desired, the edges of the ends will be able to be matched although the planes of the board surfaces are in fact at an angle with respect to one another.

DETAILED DESCRIPTION OF THE INVENTION

Turning to a consideration of the disclosure hereof, it is noted that the same is shown in drawings in which FIG. 1 is a plan view showing the device hereof as mounted on a board, the same being disclosed in phantom to prevent confusion with elements of the device itself.

FIG. 2 is a sectional view taken about on a line 2—2 of FIG. 1 looking in the direction of the arrows.

Figure 3:
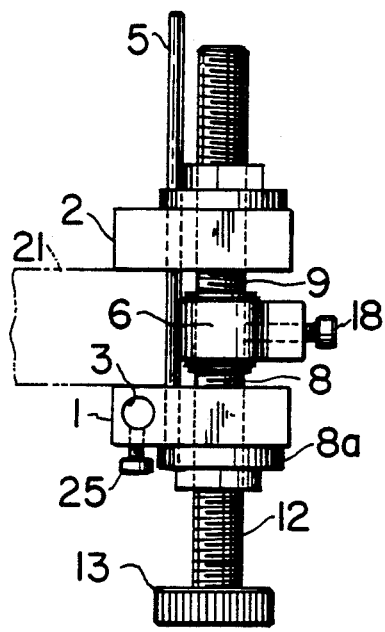
FIG. 3 is an end view looking from the left hand end of FIG. 1 and about on the line 3—3 thereof.
Figure 4:
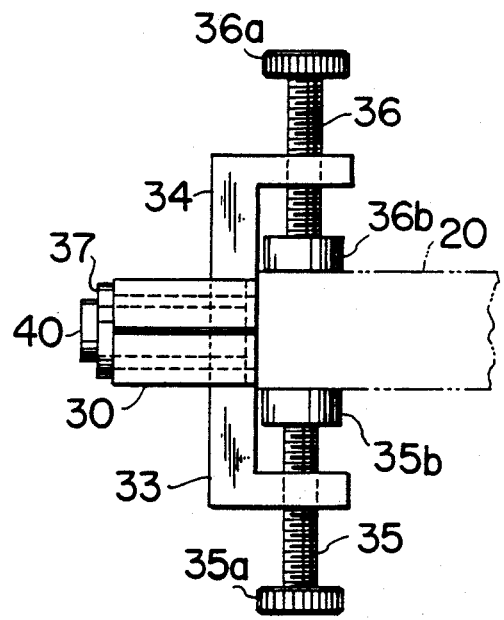
FIG. 4 is a view similar to FIG. 3 but from the opposite end of the device taken looking in the direction of the arrows 4—4 of FIG. 1.

With the description of the figures hereof in mind, we turn to a consideration of FIG. 1 initially wherein there is disclosed a pair of clamping means 1 and 2 which as suggested in FIG. 2 are generally rectilinear in form and provided with certain holes therein such as 3 for purposes which will appear subsequently. In addition it is noted that the clamping means generally comprise the movable clamp element 2 which is movable with respect to the clamp element 1 previously mentioned.

In order to maintain the aligned relationship of these clamp elements, certain guide means or rods 5 are provided, fixed at their ends to the clamp element 1 and extending through corresponding openings in the clamp element 2 to guide the respective elements in the desired relation.

Mounted between the clamp elements and freely swingable with regard thereto, is a swing block 6 which is shown in elevation in FIG. 2 as having a central opening 7 therein, which is provided to receive an operating screw 12 which is in turn equipped with right and left hand threads thereon, the right hand threads being shown at 8, the left hand threads 9 in this figure.

The central portion of the screw is rotatably received in the block 6 and maintained with regard thereto by certain snap rings such as 10, one being provided at each side of the block 6 to permit the same to rotate with regard thereto but prevent movement of the block along the screw.

The operating screw 12 having a handle 13 thereon will rotate the screw and move the respective clamp elements with regard to one another since the right hand screw 8 is received in a corresponding screw bushing 8a which is positioned in the clamp element 1 and a screw bushing 9a which is similarly mounted in the clamp element 2, these bushings having mating threads interiorly thereof. To provide for relative adjustment of the blocks if necessary, set screws 8b and 9b respectively, which engage each bushing 8a and 9a may be backed off, and subsequently tightened to fix the same once adjusted after the swing block 6 has been precisely centrally positioned.

It will thus be observed that by rotation of the screw designated 12 by the handle 13 thereon, movement of the respective clamp elements may be effected in a uniform manner toward and from one another with regard to the swing block 6 which is maintained in its central location by snap rings 10 on each side thereof engaging with the body of the threaded operating screw 12 in a manner which will be apparent to those skilled in the art.

The swing block 6 is further provided with a vertical hole 14 as shown in FIG. 2 which is intended to receive a suitable marking device such as a pencil designated at 15 whereby the point 16 thereof will extend below the swing block 6.

The swing block is also provided with a longitudinal hole such as 17, there being a set screw 18 in the block adapted to engage with a part inserted in the hole 17 and in a manner to be subsequently described.

It will thus be noted that assuming a workpiece such as indicated in phantom at 20 is a piece of wood, the clamp elements 1 and 2 may be arranged so as to be slightly spaced from the respective faces of such wood above the edge thereof, for marking purposes which will now be set forth.

The clamping elements are in the position described at the opposite sides of the board 20, with the swing block above the edge which is designated at 21, for marking purposes.

Thereafter the pencil 15 is inserted in the opening 14, so that the point will protrude below the swing block 6 and upon movement of the clamp elements along the sides at the upper edges of the board 20, cause the pencil to mark the center line thereon for use as will be subsequently explained, the center line being indicated at 22.

It appears desirable at this point to describe another function of the just detailed clamping elements 1 and 2, which is to provide for holding down boards which are being ripped on a circular saw table.

In this use the clamping elements 1 and 2 are caused to grip a saw rip fence 21a indicated in dotted lines in FIG. 2 by manipulating the operating screw 12 by handle 13.

A stop rod 23 which is L-shaped with the end 24 extending at right angles to the body 23a, is positioned as shown in the Figure, with the end 24 extending leftwardly and fastened in the opening or bore 3 by set screw 25.

The end 24 is located about the height equivalent to the thickness of a board 24a, which is to be ripped by a saw 24b, suggested in dotted lines, and over a table 24c at a table saw 24d.

The stop rod 23 may also be used in conjunction with a saw of the type just described, to cut blocks of predetermined length, by re-positioning the clamping elements 1 and 2 as a unit into what may be termed a vertical position shown in phantom in FIG. 2, which involves rotating the elements 1 and 2 as a unit, counter-clockwise around one of the rods 5, as it rests on the upper edge of the fence 21a previously mentioned, and tightening the elements 1 and 2 again by the screw 12 and handle 13, to maintain the vertical position described.

Thus the stop rod 23 is now in horizontal position and to take advantage of the stopping action of the end 24, the rod will be rotated in opening 3, so that the end 24 extends downwardly and available for stopping purposes.

The position of the end may be varied by sliding the body 23a in the bore 3 and fixed where desired by set screw 25.

The first part of the device having been set forth in detail, it is noted that the swing block 6 is adapted to receive a second block 30 which will be designated generally as an outboard block.

This block is provided with a rod 26 extending thereinto, this rod being of any preferred length and arranged to be engaged in the corresponding opening 17 of the swing block 6. The connecting rod 26 is fastened by set screw 27 at one end and the set screw 18 previously referred to may be caused to engage the rod 26 and thus position the outboard block 30 with respect to the entire previously described mechanism.

It will thus be seen that the outboard block 30 may be adjusted toward and from and in fact rotatably relative the swing block 6. When it is desired to avail of the marking of the centerline 22 previously mentioned, the outboard block 30 is provided with a V groove 31 at its outer end, which is intended to take advantage of the centerline marked 22 on the edge of a board if movement of the swing block 6 and its associated parts along the edge of the board is desired as previously mentioned.

If the V groove 31 is slightly misaligned with relation to the line 22, adjustment of the outboard block 30 may be effected by certain adjusting instrumentalities which include arms 33 and 34 extending outwardly from the block 30, these arms mounting suitable adjusting screws 35 and 36 respectively with operating knobs 35a and 36a also respectively.

Inwardly of the threaded screws 35 and 36 are the pressure pads 35b and 36b respectively, whereby adjustment of either of the screws or both of them as the case may be, will enable alignment of the V groove 31 with regard to the centerline 22 drawn along the edge of the board 20.

The purpose of having this adjustment of course is to make possible drilling of holes in the board edge in absolute centrally disposed locations. To that end the outboard block 30 is provided with certain drill bushings such as 37 of identical form which have flanges at their upper ends designated 38 in each case to position the drill bushings 37 in their desired location in the block 30.

The bushings 37 are of any preferred inner diameter to receive drills of corresponding diameter for the drilling operation and the bushings in turn are equipped with certain detents such as indicated at 38a in each case. These detents prevent rotation of the bushings while the drilling operation is being performed in either one or the other of the bushings 37. These may be described as sort of ramp-like formations, which are formed by an appropriate tool arranged to strike the flange 38 to thereby cause a portion of the flange to be raised above the plane of the flange.

Each detent is arranged as a protrusion from the upper surface of the face of the flange 38 to engage a central stop screw 40 which is mounted in the block and thus prevents rotation of the respective bushings during the drilling operation.

The flanges 38 of the bushings are provided with suitable sliced off areas 38c to permit removal of the bushings when rotated correspondingly to escape the head of the stop screw 40 as will be understood from a consideration of FIG. 1.

This provision is also to make possible the use of bushings of various drill sizes in their respective locations.

It will thus be observed that once the centerline of the edge of a board is marked, and the outboard block is adjusted with regard to the swing block 6, for location of the holes bearing in mind the position of the stop rod 23, corresponding holes may be drilled in corresponding boards and thereby make possible matching of these holes for the insertion of dowels and thus the mating of the boards in planar relation as may be desired.

Figure 5:
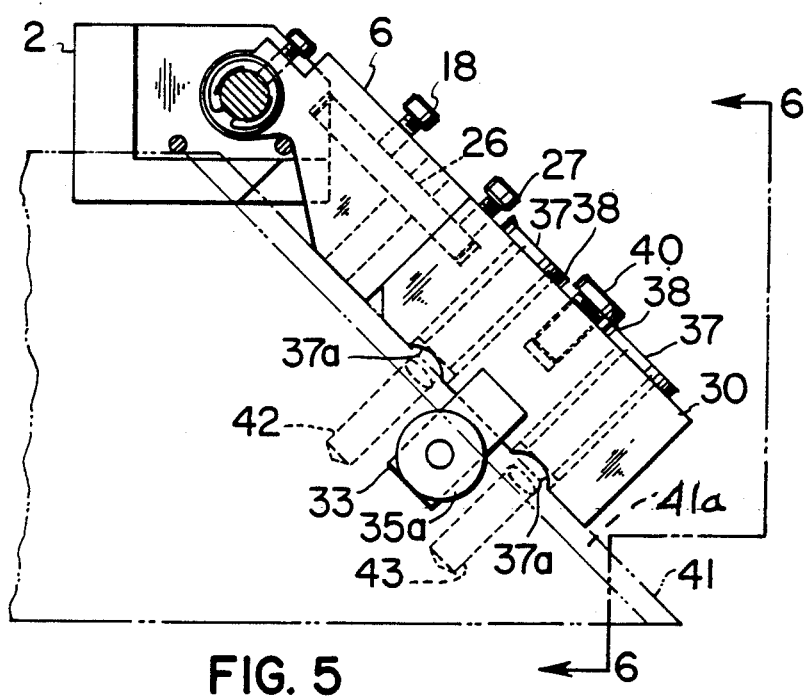
FIG. 5 is a fragmentary view with the relationship of certain of the parts modified for purposes which will appear.

One of the reasons for providing a swing block 6 is to make possible drilling of holes in miter joints such as suggested in FIG. 5 by the phantom board such as 41, having a surface 41a as indicated this enabling the block to swing into the position of the figure and permitting the drilling of holes such as suggested at 42 and 43 if desired. This makes possible the joining of a corresponding miter of another board all in accordance with woodworking practice and particularly of course in this instance suitable for making picture frames or similar mitered joint connections.

It will also be observed that different angles of the swing block may be provided and thus enable the drilling of holes in different boards in different positions and yet providing for alignment of holes in other boards corresponding thereto.

Figure 6:
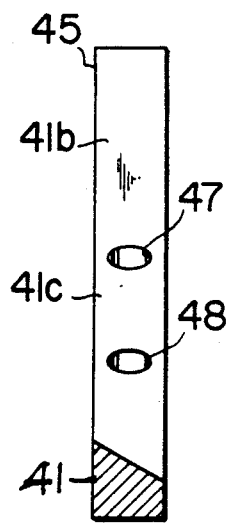
FIG. 6 is a view partly in section and partly in elevation taken about on the line 6—6 of FIG. 5, looking in the direction of the arrows.

As is disclosed in FIG. 6, which is in phantom by appropriate indication on FIG. 5, if it is desired to drill holes for dowels or the like in a surface such as 41a, the outboard block 30 may be suitably manipulated into a position for tht purpose.

In this case, however, the surface, now designated 41b is disposed angularly with respect to the face 41c of a board 45, having a mitered end thereon like the board of FIG. 5, so as to present the compound surface 41b, into which the holes here designated 47 and 48 are to be drilled.

To effect such drilling, the outboard block 30 is rotated on the rod 26 while it is in the opening 17, and at the necessary distance from the block 6, subsequently fastened by set screw 8, and thereafter the holes drilled as required.

Mating holes in another board may then be drilled, dowels inserted if desired, and the boards thus connected appropriately with the surfaces in planar relation.

We claim:

1. A marking, gauging, and dowel drilling device, comprising first clamping guiding means comprising a pair of clamping elements, one of which is movable, means to move said movable element toward and from the other element, said means consisting of an operating screw engaging both elements, means to guide said elements during said movement, a swing block arranged for pivotal movement between said elements, means normally to maintain said swing block in uniform spaced relation intermediate the clamping elements and upon movement thereof, indicating means carried by said swing block for center determination indication on a workpiece, and other means connected to said swing block for alignment therewith and cooperating instrumentalities to use the indicating means aforesaid.

2. A device as claimed in claim 1, wherein said other means include provisions for connection to the swing block and comprise a second outboard block having center responsive means for alignment with the center determination indication on a workpiece, said second block having at least one drill receiving portion to guide a drill into position to form a dowel receiving opening aligned with the center determined and indicated on such workpiece as aforesaid.

3. A device as claimed in claim 2, wherein adjustable instrumentalities are carried by the second block to maintain said second block in position whilst dowel receiving openings are formed in such workpiece.

4. A device as claimed in claim 2, wherein adjustable instrumentalities are carried by the second block to maintain said second block in position whilst dowel receiving openings are formed in such workpiece, said instrumentalities facilitating correction of misalignment of said second block with respect to the determined center line aforesaid.

5. A device as claimed in claim 2, wherein adjustable elements are provided to position the blocks logitudinally with respect to one another including parts to maintain the blocks in adjusted relation.

6. A device as claimed in claim 2, wherein a stop part is adjustably mounted in the clamping means to establish predetermined position of same with regard to a workpiece.

7. A device as claimed in claim 1, wherein the operating screw is provided with right and left hand threads thereon, said threads engaging a bushing mounted in each clamping element mating with said screw right and left hand threads to effect simultaneous relative movement of the respective clamping elements.

8. A device as claimed in claim 7, wherein the bushings are each adjustable with respect to its corresponding clamping element to maintain uniform movement of the clamping elements with respect to each other and a workpiece engaged thereby.

9. A device as claimed in claim 2, wherein the second block is rotatably adjustable to fixed positions, whereby holes may be drilled angularly with respect to the swing block.

10. A device as claimed in claim 6, wherein the clamping maens are movable to position the stop part in vertical position for hold-down purposes, and horizontal position for stopping movement of a workpiece with with respect to said means.

* * * * *